United States Patent [19]

Koda et al.

[11] 4,355,149

[45] Oct. 19, 1982

[54] CYCLOFLUOROSILICONE-CONTAINING COMPOSITIONS FOR THE TREATMENT OF FIBERS

[75] Inventors: Yoshinobu Koda, Chibashi; Isao Ona, Chiba; Atsushi Takeda, Ichihara, all of Japan

[73] Assignee: Toray Silicone Co., Ltd., Tokyo, Japan

[21] Appl. No.: 252,696

[22] Filed: Apr. 9, 1981

[51] Int. Cl.³ ............................................. C08G 77/06
[52] U.S. Cl. ..................................... 528/18; 524/108; 524/110; 524/233; 524/284; 524/300; 524/315; 528/15; 528/17; 528/19; 528/31; 528/37
[58] Field of Search .......... 260/18 S, 29.2 M, 32.8 SB, 260/33.2 SB, 32.6 R, 31.2 R, 30.4 SB 33.6 SB, 33.4 SB; 528/31, 37, 18, 17, 15, 19; 524/108, 110, 233, 284, 300, 315

[56] References Cited

U.S. PATENT DOCUMENTS 3,455,878 7/1969 Quaal ..................................... 528/31

FOREIGN PATENT DOCUMENTS 47-38505 9/1972 Japan .
50-140388 11/1975 Japan .
1022095 3/1966 United Kingdom .

*Primary Examiner*—Melvyn I. Marquis
*Attorney, Agent, or Firm*—George A. Grindahl

[57] ABSTRACT

Fiber-treating compositions are described which durably provide water repellency and oil repellency for the treated fibers. These compositions comprise a cyclic siloxane bearing fluorinated hydrocarbon radicals and silicon-hydride atoms, and a dehydrogenation catalyst. Curing of the compositions occurs by a dehydrogenation condensation reaction between the silicon-hydride atoms and/or between the silicon-hydride atoms and the hydroxyl radicals of an optionally added hydroxylendblocked organopolysiloxane.

5 Claims, No Drawings

CYCLOFLUOROSILICONE-CONTAINING COMPOSITIONS FOR THE TREATMENT OF FIBERS

BACKGROUND OF THE INVENTION

The present invention relates to silicone compositions for the treatment of fibers. More precisely, it concerns polysiloxane compositions which can impart water repellency and oil repellency to fiber materials.

Conventionally, water repellency is imparted to fiber materials using methylhydrogenpolysiloxane or dimethylpolysiloxane directly, or as an aqueous emulsion or a solution in an organic solvent, a catalyst for curing and with subsequent heating treatment. In this case, the treated fiber materials actually demonstrate effective water repellency, but their oil repellency is poor.

Therefore, a specific fiber treatment agent primarily consisting of fluorinated hydrocarbons is generally used to impart oil repellency to the fiber materials. In this case, this treatment agent is very expensive and the treatment process is very difficult because of the limitation of solvents for dilution. In addition, the drawback cannot be avoided that an undesirable feel is given to the treated fiber materials and in particular to fabrics for clothing.

In Kokai Japanese Patent No. Sho 50(1975)-140388, it was proposed that a partially hydrolyzed condensation product of diorganopolysiloxanes containing perfluoroalkyl-alkoxysilane and alkyl-alkoxysilane units and having OH groups at both ends can be used for dirt protection on inorganic materials such as slate slabs and tiles. However, it is actually very difficult for such a resin-like coating agent to penetrate into the interior of fiber materials. In terms of chemical composition, such an agent is completely different from the compositions of this invention.

In Japanese Patent No. Sho 47(1972)-38505, it was proposed that a filter cloth having excellent durability with respect to twisting and excellent lubrication properties can be obtained by treating an inorganic fiber cloth with an organopolysiloxane containing trifluoromethyl-substituted aromatic groups. In this case, the cloth obtained lacks washing resistance and hot water washing resistance because of the noncuring nature of the treatment agent.

In Japanese Patent No. Sho 42(1967)-2637, a method for imparting water repellency to fibrous organic materials was proposed by the treatment of fibrous materials with vapor of perfluoroalkyl-group-containing silane. According to this method, the control of the treatment process is very difficult and there is the drawback that retention and durability of the treatment effects are poor.

BRIEF SUMMARY OF THE INVENTION

It is an object of this invention to provide compositions which durably impart both oil repellency and water repellency to fiber materials. This object, and others which will be obvious upon considering the following disclosure and appended claims, are obtained by the present invention wherein a curable organopolysiloxane composition comprising a cyclic organopolysiloxane comprising silicon-atom-bound fluorinated hydrocarbon radicals and silicon-atom-bound hydrogen atoms is mixed with a dehydrogenation condensation catalyst and the resulting composition of this invention is applied to a fiber material.

DETAILED DESCRIPTION OF THE INVENTION

This invention relates to a composition for the treatment of fibers, said composition being obtained by mixing components comprising (A) a siloxane component comprising (a) a cyclic organohydrogenpolysiloxane in which at least 5 percent of the total of organic radicals plus silicon-atom-bound hydrogen atoms are fluorinated monovalent hydrocarbon radicals and which contains at least two silicon-atom-bound hydrogen atoms per molecule, or (b) a mixture comprising (b)(1) the above-mentioned component (a) and (b)(2) a substantially linear organopolysiloxane which consists of from 5 to 100 mol percent of $RQSiO_{2/2}$ units, from 0 to 95 mol percent of $R'R''SiO_{2/2}$ units and a silicon-atom-bound hydroxyl radical at each terminus, wherein R denotes an unsubstituted monovalent hydrocarbon radical having from 1 to 6 carbon atoms, Q denotes a fluorinated monovalent hydrocarbon radical and R' and R'' denote monovalent hydrocarbon radicals and (B) a curing catalyst component for dehydrogenation condensation between silicon-atom-bound hydrogen atoms or between silicon-atom-bound hydrogen atoms and silicon-atom-bound hydroxyl radicals.

The compositions of this invention form a cured film having both oil repellency and water repellency on fibers by the formation of cross-links by dehydrogenation due to the catalytic action of component (B) with component (A). Component (A) can be component (a) alone or a mixture of component (b)(1) and component (b)(2).

Component (a) is the component which imparts both oil repellency and water repellency. This component (a) contains at least two silicon-atom-bound hydrogen atoms per molecule. The cross-links are formed by dehydrogenation condensation due to the catalytic action of component (B) and a cured film is formed on the fiber surface. This cyclic polyorganopolysiloxane selectively consists of $RHSiO_{2/2}$, $QHSiO_{2/2}$, $H_2SiO_{2/2}$, $RQSiO_{2/2}$ $Q_2SiO_{2/2}$ and $R_2SiO_{2/2}$ units. In order to impart both oil repellency and water repellency, fluorinated hydrocarbon radicals must be present in at least a proportion of 5 percent relative to the total number of organic radicals plus hydrogen atoms which are bound to silicon atoms. In addition, at least two hydrogen atoms bound to silicon atoms must be present per molecule in order to form a cured film. The cyclic organohydrogenpolysiloxane is generally a cyclic trimer to cyclic octamer, possibly containing higher cyclic siloxanes.

Examples of R radicals in component (a) include alkyl radicals, such as methyl, ethyl and propyl; alkenyl radicals, such as vinyl and allyl; and phenyl radicals.

Examples of Q radicals in component (a) include $CF_3CH_2CH_2$, $CF_3CF_2CH_2CH_2$, $CF_3CH_2CH_2CH_2$, $CF_3CF_2CH_2CH_2CH_2$, $(CF_3)_2CHCH_2$, $CF_3(C_6H_4)CH_2CH_2$, $CF_3(C_6H_4)$ and $CF_3CF_2CF_2(C_6H_4)CH_2CH_2$. Examples of $RQSiO_{2/2}$ units in component (a) include $(CF_3CH_2CH_2)(CH_3)SiO_{2/2}$ units, $(CF_3CH_2CH_2)(C_6H_5)SiO_{2/2}$ units, $(CF_3CH_2CH_2)(CH_2=CH)SiO_{2/2}$ units, $(CF_3CF_2CH_2CH_2)(CH_3)SiO_{2/2}$ units and $(CF_3C_6H_4)(CH_3)SiO_{2/2}$ units.

Examples of $Q_2SiO_{2/2}$ units in component (a) include $(CF_3CH_2CH_2)_2SiO_{2/2}$ units, $(CF_3CH_2CH_2)(CF_3CF_2CH_2CH_2)SiO_{2/2}$ units and $(CF_3CH_2CH_2)(CF_3C_6H_4)SiO_{2/2}$ units.

Examples of $R_2SiO_{2/2}$ units in component (a) include $(CH_3)_2SiO_{2/2}$ units, $(CH_3)(C_6H_5)SiO_{2/2}$ units, $(CH_3)(CH_2=CH)SiO_{2/2}$ units and $(C_6H_5)_2SiO_{2/2}$ units.

Examples of silicon-hydride-containing units in component (a) include $(CF_3CH_2CH_2)(H)SiO_{2/2}$ units, $(CF_3C_6H_4)(H)SiO_{2/2}$ units, $(CH_3)(H)SiO_{2/2}$ units and $(C_6H_5)(H)SiO_{2/2}$ units.

Component (a) can be prepared by any of the well-known methods for preparing cyclic organohydrogenpolysiloxanes. Typically a hydrolyzable silane, such as $(CF_3CH_2CH_2)(H)SiCl_2$, or a mixture of hydrolyzable silanes, such as $(CF_3CH_2CH_2)(CH_3)SiCl_2$ and $(CH_3)(H)SiCl_2$, can be hydrolyzed and equilibrated under the influence of a silanol-condensing and siloxane-equilibrating catalyst. Alternatively, specific cyclic organohydrogenpolysiloxanes can be isolated by fractional distillation of the condensed and equilibrated hydrolyzate. Alternatively, component (a) can be prepared by the addition of an unsaturated fluorinated hydrocarbon, such as $CF_3CH=CH_2$, to a portion of the silicon-atom-bound hydrogen atoms in a cyclic organohydrogenpolysiloxane, such as $\{(CH_3)(H)SiO_{2/2}\}_4$.

Component (a) can be used alone; however, it can also be used as a mixture with a diorganopolysiloxane having silicon-atom-bound hydroxyl radicals at both ends, i.e. a hydroxyl-endblocked polydiorganosiloxane. Examples of hydroxyl-endblocked polydiorganosiloxanes include component (b)(2) delineated below and siloxanes having the formula $HO(R'R''SiO_{2/2})_xH$ wherein x is a positive integer and R' and R'' are as delineated below.

Component (b), which can be used alternatively to component (a), is a mixture of said component (a), herein also denoted as component (b)(1), with component (b)(2). Component (b)(2) is also a component which imparts both oil repellency and water repellency as does component (a). Since hydroxyl groups bound to silicon atoms are present at the ends of the molecular chain of component (b)(2), component (b)(1) having hydrogen atoms bound to silicon atoms is used as a cross-linking agent. The cross-links are formed by dehydrogenation condensation due to the catalytic action of component (B) and a cured film is formed on the fiber surface.

Component (b)(2) is a substantially linear organopolysiloxane whose viscosity at room temperature can range from a freely flowing liquid to a slowly flowing gum. By the expression that component (b)(2) is substantially linear it is meant that it is completely linear, i.e. consisting only of molecular-chain silicon atoms linked by only two oxygen atoms and terminating hydroxyl-bearing silicon atoms linked by only one oxygen atoms; or only slightly branched, i.e. further comprising only trace amounts of silicon atoms linked by three or four oxygen atoms.

Component (b)(2) consists of from 5 to 100 mol percent of $RQSiO_{2/2}$ units and from 0 to 95 mol percent of $R'R''SiO_{2/2}$ units. If the proportion of $RQSiO_{2/2}$ units is less than 5 mol percent, the oil repellency of a fiber treated therewith is insufficient.

The $RQSiO_{2/2}$ units, R radicals and Q radicals in component (b)(2) are as delineated for component (a) above; however, the siloxane units in component (b)(2) can be the same as, or different from, the siloxane units in component (a).

Examples of R' and R'' radicals in component (b)(2) include alkyl radicals, such as methyl, ethyl and octyl; alkenyl radicals such as vinyl and allyl; aryl radicals, such as phenyl and tolyl; and arylalkyl radicals such as benzyl and beta-phenylethyl. R' and R'' can denote the same or different radicals.

Examples of $R'R''SiO_{2/2}$ units in component (b)(2) include $(CH_3)_2SiO_{2/2}$ units, $(CH_3)(C_6H_5)SiO_{2/2}$ units, $(CH_3)(CH_2=CH)SiO_{2/2}$ units, $(C_6H_5)_2SiO_{2/2}$ units, $(C_6H_5)(CH_2=CH)SiO_{2/2}$ units and $(CH_3)(C_6H_5CH_2)SiO_{2/2}$ units. Component (b)(2) can contain a single type of $R'R''SiO_{2/2}$ units or a mixture of two or more types of $R'R''SiO_{2/2}$ units.

Component (b)(2) can be prepared by any of the well-known methods for preparing hydroxyl-endblocked polydiorganosiloxanes. Typically a hydrolyzable silane; such as $RQSiCl_2$, such as $(CF_3CH_2CH_2)(CH_3)SiCl_2$, or a mixture of hydrolyzable silanes; such as $RQSiCl_2$ and $R'R''SiCl_2$, such as $(CF_3CH_2CH_2)(CH_3)SiCl_2$ and $(CH_3)_2SiCl_2$ is hydrolyzed in an organic solvent and the hydrolyzate is condensed in the presence of a silanol-condensing catalyst.

Component (b)(1) is a cross-linking agent for component (b)(2) as mentioned previously. In addition to an indispensable amount of component (b)(1) as a cross-linking agent, small quantities of other organohydrogenpolysiloxanes can be used; such as organohydrogenpolysiloxanes in which both ends are capped with triorganosilyl groups, such as $(CH_3)_3SiO\{(CH_3)(H)SiO\}_xSi(CH_3)_3$, diorganosiloxane/organohydrogensiloxane copolymers in which both ends are capped with triorganosilyl groups, such as $(CH_3)_3SiO\{(CH_3)_2SiO\}_x\{(CH_3)(H)SiO\}_ySi(CH_3)_3$, organohydrogenpolysiloxanes having hydrogen atoms bound to silicon atoms at both ends, such as $H(CH_3)_2SiO\{(CH_3)(H)SiO\}_x\{(CH_3)_2SiO\}_ySi(CH_3)_2H$ and organohydrogencyclicpolysiloxanes, such as $\{(CH_3)(H)SiO\}_x$. In addition, this organohydrogenpolysiloxane can be used along with component (a). Examples of organic groups in said other organohydrogenpolysiloxanes are the R radicals denoted above for component (a). Said other organohydrogenpolysiloxane is generally a liquid at room temperature wherein x and y have suitable values greater than zero. Organohydrogenpolysiloxanes are well known in the silicone polymer art and need no further elaboration here as to composition and/or to methods of preparation.

The amount of component (b)(1) is preferably an amount which is sufficient to provide hydrogen atoms bound to silicon atoms in a molar proportion greater than the molar proportion of hydroxyl groups bound to silicon atoms in component (b)(2).

Component (B) is an indispensable component for cross-linking component (a) or for cross-linking component (b) comprising component (b)(1) and component (b)(2). Examples of this component may be acid salts of heavy metals, such as tin, lead, zirconium, zinc, iron and manganese. In particular, carboxylic acid salts, titanic acid esters and platinic acid salts are preferred. Examples of these acid salts include dibutyltin diacetate, dibutyltin dilaurate, dioctyltin dilaurate, dibutyltin dioctylate, tin octylate, tin dioctylate, diisooctylic acid mercaptoacetate, zinc octylate, zirconium naphthenate, manganese naphthenate, iron naphthenate, tetrabutyl orthotitanate and chloroplatinates.

Component (B) is generally used in an amount of 0.1 to 20 parts by weight to 100 parts by weight of component (A). An appropriate proportion can be selected according to the types and amounts of functional groups in component (A) and the curing conditions. In particular, it can be appropriately selected according to the temperature that is used to cure component (A).

The compositions of this invention for the treatment of fibers are easily produced simply by mixing component (a) and component (B), or by mixing component (b) comprising components (b)(1) and (b)(2), and component (B).

When fiber materials are treated with the compositions of this invention, the treatment is preferably carried out in a solution using an appropriate diluent such as acetone, methyl ethyl ketone, methyl isopropyl ketone, diethyl ketone, cyclohexanone, acetylacetone, tetrahydrofuran, dioxane, ethyl acetate, propyl acetate, butyl acetate, amyl acetate, methyl propionate, ethyl propionate, dimethylformamide, dimethylacetamide and methyl cellosolve acetate. In some cases, other solvents which are commonly used for organopolysiloxanes, such as toluene, xylene, isopropyl alcohol and hexane, can be mixed with the above-mentioned solvents in an appropriate amount.

In addition, water and an appropriate surfactant, for example selected from among higher alcohol sulfates, alkyl benzenesulfonates, higher alcohol polyoxyalkylene adducts, higher fatty acids polyoxyalkylene adducts, alkylphenol polyoxyalkylene adducts and fatty acid ester polyoxyalkylene adducts can be added to the compositions of this invention as a diluent and the obtained emulsions applied to the fiber materials.

The compositions of this invention, or their dilute solutions in an organic solvent or their emulsions are used for the treatment of fiber materials following common methods which are generally used for fiber treatment processes. For example, processes such as immersion, roller-coating or spraying are applicable. If desirable, the treatment is carried out with heating. As a result, durable water repellency and oil repellency can be imparted to the surface of a fiber material or within an interior layer of a fiber material.

As additional effects, a mold-release property and pliability can be imparted to fiber materials. The fiber materials specified in this invention may be natural fibers such as wool, silk, cotton, flax and asbestos; regenerated fibers such as rayon and acetate; synthetic fibers such as polyesters, polyamides, polyvinyl alcohol, polyacrylics and polyolefins; and other fibers, such as glass fibers. The compositions of this invention are applicable to these fiber materials in various forms, such as fibers, filaments, knitted materials, woven fabrics and nonwoven fabrics. Preferably, it is most effective to carry out the treatment continuously on sheet forms such as knitted fabrics and nonwoven fabrics. In particular, in the case of nonwoven fabrics, other binders such as styrene-butadiene rubber latex and nitrile rubber latex can be also added.

The present invention will be further explained in the following examples. "Parts" indicated in the examples denotes "parts by weight".

EXAMPLE 1

A cyclic polysiloxane expressed by the following structural formula (hexamer):

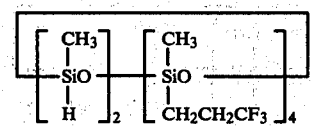

(100 parts) was dissolved in methyl ethyl ketone (2390 parts). Subsequently, dibutyltin diacetate (10 parts) was added and dissolved uniformly in the solution to provide treatment solution A. For a comparison, a cyclic methylhydrogenpolysiloxane expressed by the following structural formula (hexamer):

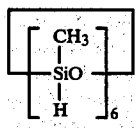

(100 parts) was dissolved in toluene (2390 parts) and dibutyltin diacetate (10 parts) was added to provide a comparative treatment solution B.

A piece of dyed raincoat fabric of Tetoron 65/wool blend fabric (polyester/wool blend) was immersed in the respective treatment solutions. The immersed piece was dried by squeezing using a mangle roller to such a degree that the amount of silicone adhering was 2 wt %, and subsequently, the solvent remaining was evaporated at room temperature. Thereafter, the piece of fabric was heated at 120° C. for 10 minutes for curing the above-mentioned silicone. The treated fabric was held taut at an angle of 45° and ASTM No. 1 oil or water was dropped on the fabric. As shown in Table I, the fabric treated with the composition of this invention demonstrated excellent water repellency and oil repellency.

TABLE I

| Fluid | Cloth treated with treatment solution A this invention | Cloth treated with treatment solution B comparative example |
|---|---|---|
| Drops of ASTM No. 1 oil | high oil repellency no stains | instantaneous absorption of oil many stains |
| Drops of water | high water repellency | high water repellency |

EXAMPLE 2

An organopolysiloxane having the following structural formula

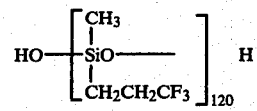

and having a viscosity of 39000 cSt at 25° C. (5 parts) and a cyclic polysiloxane (heptamer) having the following structural formula:

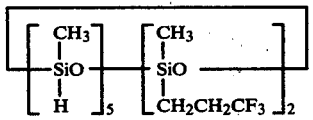

(15 parts) were dissolved in tetrahydrofuran (467 parts). After dibutyltin dilaurate (2 parts) was added, a homogeneous solution was prepared as a treatment solution of this invention. Subsequently, a polyethylene tablecloth was immersed in the treatment solution and then lifted up from the treatment solution. The tablecloth was squeezed using a mangle roller to such a degree that the amount of silicone adhering was 1.5 wt % and then dried. This tablecloth was heated in an oven at 150° C. for 5 minutes for curing. Subsequently, the same water repellency and oil repellency tests as in Example 1 were conducted on the treated tablecloth and an untreated tablecloth for comparison. Separately, 4 to 5 drops each of sauce, soy sauce and salad oil was dropped on the cloth and excess sauce was absorbed with a piece of filter paper after the sauce had been allowed to be adsorbed by the tablecloth. The condition of stains was determined by examination with the unaided eye.

As shown in Table II, no stains remained on the tablecloth treated with the composition of this invention and the treated tablecloth demonstrated excellent water repellency and oil repellency.

TABLE II

| Fluid | Treated cloth of this invention | Untreated cloth of comparative example |
|---|---|---|
| Drops of ASTM No. 1 oil | high oil repellency no stains | instantaneous absorption of oil many stains |
| Drops of water | high water repellency | no water repellency |
| Sauce | no stains | many stains |
| Soy sauce | no stains | many stains |
| Salad oil | no stains | many stains |

That which is claimed is:

1. A composition for the treatment of fibers, said composition being obtained by mixing components comprising
    (A) a siloxane component comprising
        (a) a cyclic organohydrogenpolysiloxane in which at least 5 percent of the total of organic radicals plus silicon-atom-bound hydrogen atoms are fluorinated monovalent hydrocarbon radicals and which contains at least two silicon-atom-bound hydrogen atoms per molecule, or
        (b) a mixture comprising
            (b)(1) the above-mentioned component (a) and
            (b)(2) a substantially linear organopolysiloxane which consists of from 5 to 100 mol percent of $RQSiO_{2/2}$ units, from 0 to 95 mol percent of $R'R''SiO_{2/2}$ units and a silicon-atom-bound hydroxyl radical at each terminus, wherein R denotes an unsubstituted monovalent hydrocarbon radical having from 1 to 6 carbon atoms, Q denotes a fluorinated monovalent hydrocarbon radical and R' and R" denote monovalent hydrocarbon radicals, and
    (B) a curing catalyst component for dehydrogenation condensation between silicon-atom-bound hydrogen atoms or between silicon-atom-bound hydrogen atoms and silicon-atom-bound hydroxyl radicals.

2. A composition according to claim 1 wherein component (A) is a cyclic organohydrogenpolysiloxane having the formula $\{(CH_3)(H)SiO\}_x\{(CF_3CH_2CH_2)(CH_3)SiO\}_y$ wherein x and y are positive integers.

3. A composition according to claim 1 wherein component (A) is a mixture of an organopolysiloxane having the formula $HO\{(CH_3)(CF_3CH_2CH_2)SiO\}_xH$ wherein x is a positive integer and having a viscosity at room temperature ranging from a freely flowing liquid to a slowly flowing gum and a cyclic organohydrogenpolysiloxane having the formula $\{(CH_3)(H)SiO\}_x\{(CF_3CH_2CH_2)(CH_3)SiO\}_y$ where x and y are positive integers.

4. A composition according to claims 1, 2 or 3 wherein component (B) is an acid salt of tin selected from the group consisting of dibutyltin diacetate, dibutyltin dilaurate, dibutyltin dioctylate, tin dioctylate and dioctyltin dilaurate and is present in the composition in an amount of from 0.1 to 20 parts by weight for every 100 parts by weight of component (A).

5. A composition according to claims 1, 2 or 3 further comprising an organic solvent or water containing a surfactant as a diluent.

* * * * *